March 10, 1942.   W. W. HALLINAN   2,275,429
VARIABLE SPEED PULLEY
Original Filed Jan. 13, 1940
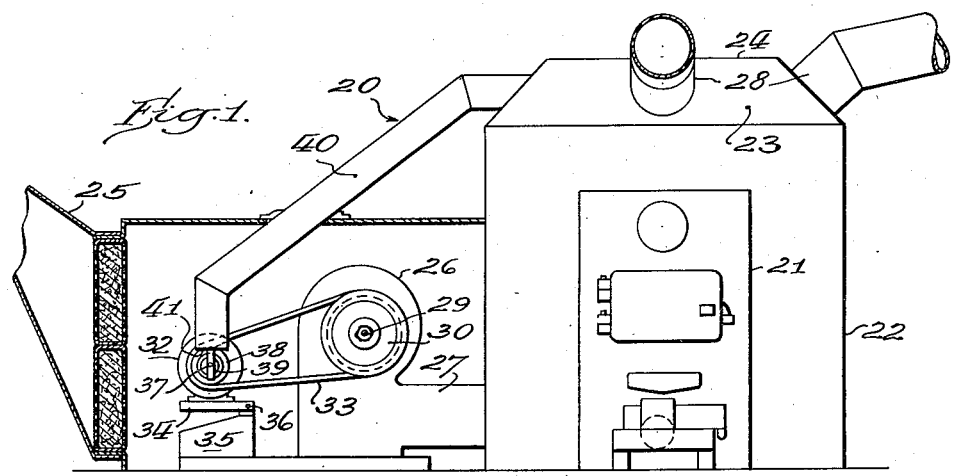
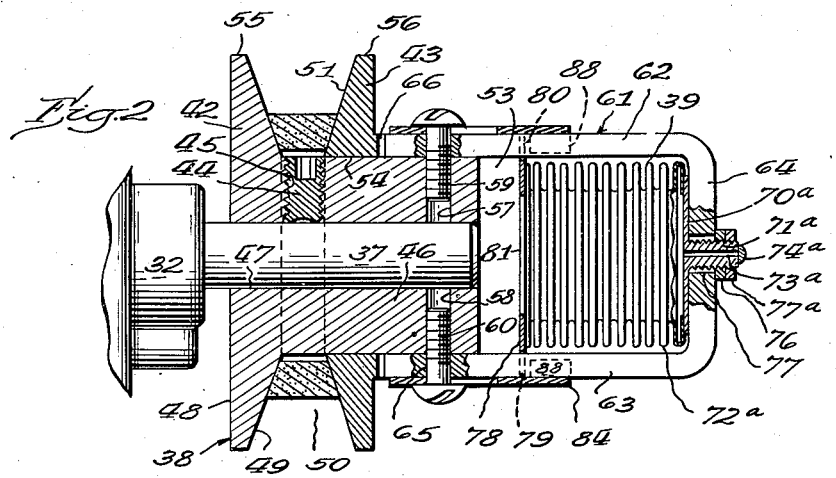
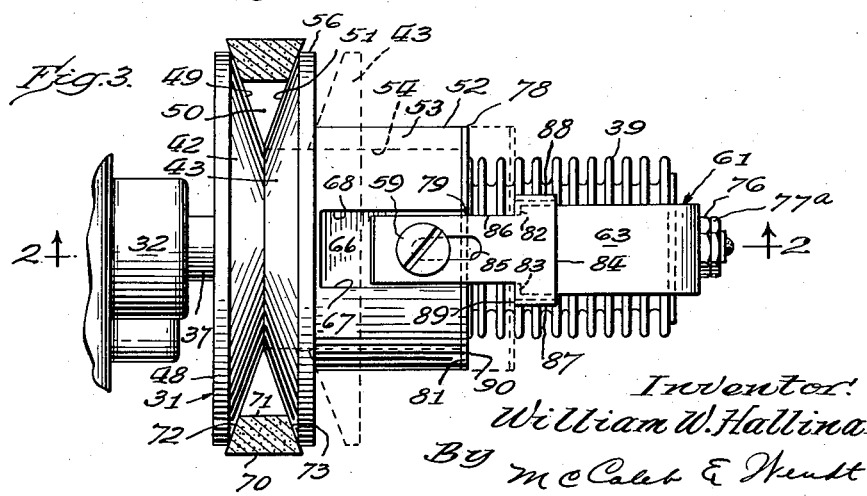
Inventor:
William W. Hallinan
By McCaleb & Wendt
Attys.

Patented Mar. 10, 1942

2,275,429

UNITED STATES PATENT OFFICE 2,275,429

VARIABLE SPEED PULLEY

William W. Hallinan, Mendota, Ill.

Original application January 13, 1940, Serial No. 313,673. Divided and this application January 22, 1941, Serial No. 375,393

14 Claims. (Cl. 74—230.17)

The present invention relates to variable speed pulleys, and is particularly concerned with variable speed pulleys controlled responsive to variations in pressure or temperature, and adapted to provide a continuously and uniformly varying change of speed if used as a driven or driving member.

The present application is a division of my application, Serial No. 313,673, filed January 13, 1940, which is in turn a continuation-in-part of my prior application, Serial No. 196,003, filed March 15, 1938, for Variable speed pulleys, Patent No. 2,210,976, issued August 13, 1940.

The variable speed pulleys constructed according to the present invention are capable of many different applications. For example, they may be used for controlling the speed of a conveyor for conveying articles to be treated with heat, through a heated or drying atmosphere, or they may be used as a drive in a refrigerator system in which the temperature controls the speed of a compressor or a circulating fan.

One of the most important applications of my variable speed pulley as it now appears to me is in the application of the pulley to the circulation of air in heating or air conditioning systems. For example, according to the methods of the prior art, air conditioning systems are provided with standard pulleys, the parts of which are manually adjustable, so as to give the driven member a predetermined speed, and the pulleys on the motor and fan are so adjusted relative to each other to bring in sufficient air to take care of the maximum heating load.

Under these conditions it is necessary to set the thermal control for the switch which controls the fan motor at about 175 degrees F., although it is sometimes set at 150 degrees F., and these relatively high temperatures are necessary to prevent the blowing of a blast of cold air by the circulating fan.

If the thermal control for the circulating fan motor is set at a lower temperature, the fan will start to operate before the bonnet of the furnace has been heated to a sufficient temperature to heat the air which is circulated by the fan.

Under these conditions of the prior art I have found that the fan motor starts and shuts off a number of times before it starts to run regularly to circulate the air. For example, the fan may start and run for a minute or so and then shut off, for the reason that as soon as the fan motor is started the cold air, which is brought in at the maximum pulley speed, cools off the bonnet and thermal control and immediately shuts the fan off again.

This is not a desirable mode of operation.

One of the objects of the present invention is the provision of an improved variable speed pulley and heating system, in which this intermittent action of the fan is eliminated, and in which it is not necessary to operate the furnace at such a high bonnet temperature. A lowering of the operating temperature is less wasteful of fuel, and more economical.

Another object of the invention is the provision of an improved variable speed pulley and heating system, in which the furnace may be operated at a lower temperature and within a smaller range of temperature variation for the purpose of maintaining a more uniform temperature in the space to be supplied with heated air, and in order to operate the system more efficiently.

According to the practices of the prior art, furnaces which are provided with ordinary constant speed driving pulleys on their motors and circulating fans require a heating to a temperature which is too high from several points of view. In such cases it is either necessary to have the fan motor turned off to stop circulation, when the furnace burner is turned off, or the temperature will over-run that required if the fan continues to operate because the fan continues to use up the heat after the burner has stopped.

According to the present invention, the operation of the air and circulating fan is not wholly dependent upon the time of operation of the oil burner, as the air circulating fan may operate, depending upon the temperature in the bonnet, or the temperature of the bonnet of the furnace, and there is no tendency to over-run the temperature desired in the rooms heated, because the speed of operation of the circulating fan is continuously varied with the bonnet temperature, and diminishes as the temperature of the furnace bonnet or the air in the bonnet decreases.

I have found that air which is warmer than the body temperature may actually feel cooler when it is subjected to circulation, on account of the tendency of the moving air to carry away the vapors which are passed off by the skin, and therefore it is not desirable to circulate air which is only slightly warmer than the body temperature at a high speed, as must be done with the systems of the prior art, where the fan speed is required to be set at a value which is sufficient to take case of the maximum heating load.

I have also found that air which is at a temperature of from 100 degrees F. to 110 degrees F. still feels warm when it is circulating at a relatively low speed, and there is no cold air blast effect in my heating system which is operated under these conditions.

Therefore, another object of the invention is the provision of an improved heating system which is adapted to circulate the air at a speed and in a volume which is dependent upon the temperature of the circulating air so that blasts of air which feel cold may be avoided under all conditions and so that the circulation of the air in the system may be accomplished for a longer period of time and more nearly continuously to avoid stratification, or what is called a "low seventy" at certain parts of the rooms which are being heated.

According to the present invention, with the improved thermally controlled variable speed pulley of my invention, the pulley may start at a slow speed, and the thermal control for the switch, which controls the fan motor, may be set relatively low, at, for example, from 100 degrees F. to 110 degrees F.

This still feels warm, as the fan is only moving a small volume of air, but as the furnace heats up and the temperature of the air in the bonnet increases, the speed of the fan may be incearsed by the thermally controlled pulley, so that heated air is taken away more rapidly from the furnace and the heat produced by the burner is distributed more quickly when there is more heat to be distributed.

Under these operating conditions the furnace may operate at a lower temperature and there will be less heat lost in the cellar and less heat lost up the furnace stack. For example, suppose there is an upstairs demand of from 5 to 10 degrees in the morning, as there might be, this requires a greater temperature at the bonnet of the furnace, and the bonnet temperature may go up to 150 or 165 degrees F. According to the present system, the blower speed is then automatically increased as the bonnet heats up.

Another object of the present invention is the provision of an improved variable speed pulley and heating system in which the speed of operation of the circulating fan is increased automatically to compensate for any increased filter resistance. The accomplishment of this result may be analyzed as follows:

The heat input of the furnace may be assumed to be constant, and the transfer effectiveness of the furnace constant. Increased filter resistance, which is caused by filling up of the filter with dust or other foreign material, permits less air to pass through the filter and less heat is carried away from the bonnet. The furnace bonnet becomes hotter, and therefore the thermostat, which controls the pulley according to the present invention, increases the effective diameter of the pulley, increases the speed of operation of the fan, and thus automatically offsets the increased filter resistance by a higher fan speed.

Another object of the invention is the provision of an improved heating system in which the circulating fan may continue to circulate air at a low temperature continuously or almost continuously, so as to avoid stratification.

Another object of the invention is the provision of an improved thermally controlled variable speed fuel and heating system which is adaptable to heat anticipation controls. For example, I have found that the heat anticipation controls of the prior art will turn the burner on several times and then turn it off without the fan operating. This is not efficient because the heat which is produced during this intermittent operation of the burner, without fan operation, is not conveyed to the rooms to be heated.

One partial solution of such a difficulty would be the provision of a two-speed motor system, but such two-speed motor systems would be expensive and at best provide only a partial solution of the difficulty.

Therefore, another object of the invention is the provision of an improved thermally controlled variable speed pulley for heated air circulating systems, which provides a substantially continuous modulation of the fan speed, depending upon the temperature of the air to be circulated.

The volume of the blower increases with the square of the speed, and it is found that changes in volume may be made practically proportional to changes in temperature so that the relation between volume and temperature may be represented, for all practical purposes, as a straight line curve.

Another object of the invention is the provision of a thermostatically controlled variable speed pulley in which the thermostat rotates axially with the pulley, in order to eliminate pressure connections between rotating and non-rotating parts, and in which thrust bearings may be eliminated.

Another object of the invention is the provision of a thermostatically controlled variable speed pulley in which the thermostat acts against a resilient separating force imposed by a wedge action of a belt to eliminate the need for springs in the pulley structure or immediately associated therewith.

Other objects and advantages of the invention will be apparent from the following description and the accompanying drawings, in which similar references indicate similar parts throughout the several views.

Referring to the drawings, of which there is one sheet:

Fig. 1 is a diagrammatic illustration of a heating system embodying a variable speed pulley constructed according to the present invention;

Fig. 2 is an axial sectional view taken on the plane which passes through the axis of the pulley shaft, with the thermostat in elevation; and Fig. 3 is a plan view taken from the top of Fig. 2.

Referring to Fig. 1, 20 indicates diagrammatically a heating system comprising a hot air furnace 21, provided with an outer housing 22, forming a plenum chamber 23, and provided with a bonnet 24.

The plenum chamber is connected with the rooms to be heated by the usual cold air ducts 25, which lead to the ventilation fan 26, preferably of the centrifugal type, and the outlet of the fan 26 is connected by a cold air duct 27 to the plenum chamber 23.

Heated air is taken off from the bonnet 24 through a plurality of hot air ducts 28 leading to the rooms.

The centrifugal fan 26 includes the usual centrifugal impeller, mounted upon a shaft 29, the shaft being provided with a sectional V pulley 30.

The belt 33 may be held under resilient tension in any suitable manner, such as by means of a pivoted motor mounting including the base 34 and the support 35.

In the embodiment illustrated, the base 34 of the motor 32 is pivotally mounted at 36 on the support 35 so that the weight of the motor tends to maintain the belt 33 under suitable tension.

The motor shaft 37 is provided with a thermostatically controlled variable diameter pulley, indicated in its entirety by the numeral 38.

The thermostatic element 39 is subjected to heated air from the bonnet 24 by means of a conduit 40, which extends from the bonnet 24, downward to the thermostat 39, and discharges against the thermostat 39 at the discharge opening 41.

Other modes of making the thermostat responsive to the bonnet temperature comprise the use of thermostatic devices secured to the metal of the bonnet or placed inside of the bonnet, but the present system is preferred because the motor may be substantially isolated from the hottest parts of the furnace and kept in a cooler condition.

The variable speed pulley 38 comprises a pair of movable pulley sections 42 and 43, one of which, 42, is fixedly secured to the motor shaft 37 by a key or a set screw 44 mounted in a threaded bore 45.

The motor is preferably a substantially constant speed motor which would drive the fan 26 at a substantially constant speed, irrespective of the load on the fan, within certain predetermined limits.

The pulley section 42 may comprise a metal member made of suitable material, such as steel, or it may, in some embodiments, be made of fibrous material, such as molded phenolic condensation products.

The pulley section 42 is preferably provided with a centrally located cylindrical hub 46, having an axially extending cylindrical bore 47 for receiving the motor shaft 37.

At the left end in Fig. 2, the pulley section may have a flat face 48, but on its right side and outside of the hub 46 it is provided with a frusto-conical surface 49, forming one side of a substantially V shaped groove 50.

The pulley section 43 may comprise a member of similar material, having a frusto-conical surface 51, sloping away from the frusto-conical surface 49, so as to form the V shaped groove 50, and having a flat annular surface 52 surrounding the cylindrical hub 53.

The cylindrical hub 53 may be provided with a cylindrical bore 54 for slidably receiving and engaging the outer cylindrical surface of the hub 46 on the other pulley section.

The frusto-conical surface 49 and flat surface 48 of the section 42 may terminate in an annular ridge or at a cylindrical surface 55, at the periphery of the pulley section 42. In a similar manner there may be a cylindrical surface 56 at the periphery of the pulley section 43.

The hub 46 of the pulley section 42 may be provided with a pair of oppositely located and diametrically extending threaded bores 57, 58 for receiving the screw bolts 59, 60. These screw bolts may be utilized for supporting a yoke 61, which may be of substantially U shape, having a pair of legs 62, 63, joined by an end portion 64. The yoke or thermostat-supporting member 61 has a bore 65 in each of its legs 62, 63 for receiving the screw bolts 59 and 60, whereby the yoke 61 is fixedly secured to the left pulley section 42.

The hub 53 of the right pulley section is preferably provided with the axially extending slots 66 for slidably receiving the legs 62, 63 of the yoke 61. The walls 67 and 68 of slot 66 have a suitable tolerance with respect to the legs 62, 63 of the yoke 61, to permit a sliding movement, and the pulley section 43 is thus slidably mounted on the hub of the pulley section 42, but any substantial amount of rotation is prevented between these pulley sections.

It will be noted that the hub 46 of the pulley section 42 is relatively long, providing an elongated cylindrical bearing surface 46 for the outer hub 53, so that there is very little possibility of any tilting of the pulley section 43 on the pulley section 42, due to the action of V belt 33, which usually engages over slightly more or slightly less than half of the pulley at one time.

The belt 33, which has been termed a V belt, is preferably substantially trapezoidal in section, being provided with the outer cylindrical surface 70, inner cylindrical surface 71, and lateral cylindrical surfaces 72 and 73.

The axial dimension between the frusto-conical surfaces 72 and 73 is preferably relatively large so that these frusto-conical surfaces of the belt may engage the surfaces 49 and 51 on the pulley sections over a wider range of movement of the pulley.

The taper of the belt-engaging parts 49 and 51 of the pulley sections makes the engaging surfaces farther apart at larger effective diameters, and the provision of a belt of suitable dimensions in an axial direction permits the engagement of the belt with the frusto-conical surfaces on the pulley sections at greater effective diameters.

As such belts are customarily called V belts in the trade, I employ the term V belt throughout this specification and claims to include not only a belt of actual V cross-section, but a belt of the type illustrated, in which the inner ridge of the V has been eliminated, so that the belt is actually trapezoidal in cross-section.

The thermostatic controlling device 39 may consist of a metallic expansible bellows, having one end closed by a metallic supporting plate 70a, having a threaded supporting stud 71a The plate 70a has a fluid-tight soldered or welded connection, with the end of the bellows 72a, and the stud 71a may have an axial filling aperture 73a, which may be closed after filling the bellows, with a suitable expansible fluid by means of a drop of solder 74a.

Threaded stud 71a extends through a centrally located aperture 75 in the yoke 61, and the bellows is fixedly secured to the yoke 61 by a clamping nut 76 and a lock nut 77a. Thus the right end of the bellows is fixedly secured to the pulley section 42 through the intermediary of the yoke 61 and the hub 46 and screw bolts 59.

The opposite end of the bellows 72a is closed by means of a metal plate 78, which is likewise provided with a fluid-tight connection to the endmost fold of the bellows 72a, and the plate 78 is provided with a pair of slots 79 and 80 for embracing the legs 62, 63 of the yoke 61.

The plate is adapted to engage the annular end surface 81 of the hub 53 of pulley section 43 so that expansion of the bellows 72a tends to force the pulley section 43 from the position of Fig. 2 toward that of Fig. 3.

Thus a heating up of the expansible fluid inside the bellows tends to force the pulley sections together and to increase the effective diameter of the pulley 38.

The yoke 61 may be provided with suitable permanent stops for limiting the spreading of the pulley sections 42, 43 by having the ends of the legs 62, 63 of reduced width to provide stop shoulders 82, 83. The device may also be provided with suitable adjustable stop means, comprising a pair of sheet metal stop members 84, each of which are identical in shape and which are slidably mounted on the screw bolts 59 and 60 by means of slots 85.

Each of these stop members 84 comprises a substantially rectangular strip of metal of the same width as the reduced width portions 86 of the legs 62 and 63. The stop members 84 may have laterally extending portions 87 at each side, provided with depending guide flanges 88 at each side.

The guide flanges 88 engage the sides of the legs 62, 63 and prevent rotation of the stop member 84 on screw bolt 59. The left edges 89 (Fig. 3) of the extensions 87 of the stop members 84 serve as stop surfaces for engaging the annular surface 90 at the right side of the plate 78 in Fig. 3. Thus the range of spread of the pulley sections 42 and 43 may be adjusted, and the device may be used with smaller belts, that is, belts of less width in axial direction than that shown.

When the bellows is subjected to normal room temperatures or predetermined bonnet temperatures such as temperatures below which the motor 32 is not operated, the bellows is in a contracted position as shown in Fig. 2. The effective diameter of the variable speed pulley 31 is then at a minimum, and the sections 42, 43 of the pulley are automatically forced apart by the action of the wedge shaped belt 33, which is subjected to tension by a suitable tensioning device or by a tensioning weight as of the motor mounting.

Upon heating up of the bellows 39, the bellows expands under the action of the expansible fluid contained therein, and tends to force the pulley sections 42, 43 closer together from the position of Fig. 2 toward that of Fig. 3.

The effective pulley diameter is dependent upon the temperature to which the thermostats are subjected, and the taper of the belt-engaging surfaces on the pulley and the characteristics of the thermostats may be made such that the variation in speed is substantially proportional to the variation in temperature, by which I mean that the temperature speed relation may be expressed substantially as a straight line curve over a predetermined range of operation.

Upon a cooling down of the thermostat, the action of the belt and the belt-tensioning arrangement tends to force the pulley sections apart to follow up the contraction of the bellows and the effective diameter of the V pulley is at all times dependent upon the temperature to which the thermostatic elements are subjected.

The operation of the present variable speed pulleys in a heating system of the type shown in Fig. 1 is as follows: When such pulleys are employed, the critical operating bonnet temperature for the thermostatic device controlling the fan motor 32 may be set at a lower temperature, such as, for example, 100 to 110 degrees. When the bonnet reaches this temperature, the fan is turned on, but due to the fact that the parts of the pulley are in the position of Fig. 2, the effective diameter of the driving pulley is at a minimum, and the fan thus operated at a low speed, such as, for example, 275 R. P. M.

When the variable diameter pulley has its thermostatic element at or more than maximum temperature so that parts of the pulley are in the position shown in Fig. 3, the speed of rotation of the fan may be 500 R. P. M., for example. I desire it to be understood, however, that the speeds which are given for examples are not in any sense limits for practical use, as the fan's speed may be made any desired value, and the examples given are merely to show the range which has been found effective in exemplary installations.

Although the air in the bonnet is not at a high temperature, it still feels warm as it emerges from the registers when the fan is moving only a small volume of air and at a low speed. Furthermore, the amount of air moved through the plenum chamber of the furnace is not such that it cools the furnace down too quickly, and the fan will continue to operate, instead of being turned off, as I have found to be the case with the devices of the prior art.

In the arrangements of the prior art I have frequently noted that the fan operating at a maximum speed passes so much cold air through the plenum chamber that the temperature is so reduced that the fan is turned off again. This intermittent action is eliminated by my invention.

As the temperature of the air in the plenum chamber, and of course that discharged on the thermostat 39, by the duct 40, increases in temperature, the speed of the fan is automatically increased by the expansion of the thermostat and the increase in the effective diameter of the driving pulley.

The present heating system permits a continuous and gradual modulation of the fan speed so that the furnace may be operated at a lower temperature and fuel may be saved. The fan may be operated over a longer range of time, or it may be continuously operated at a lower rate of speed so as to avoid stratification and so as to constantly deliver heat from the furnace to the rooms by the moving air.

The speed varying effect of my thermostatically controlled pulley may be accentuated by the use of a belt of constant length and by having the driving and driven shafts at constant spacing, but by using a sectional spring-actuated pulley on the driven member, for taking up the effective length of the belt, which is increased or decreased, by the action of the thermostatic pulley. Thus, one pulley would increase in size, while the other decreased, and vice versa, accentuating the speed-changing effect of the thermostatically controlled pulley.

My thermostatically controlled pulley is adapted to be used either as the driving or the driven member, and its thermostatic element may be so arranged that it increases the diameter or decreases the diameter upon increase in temperature.

In addition to its use in a heating system as described, it may be used for controlling the speed of a conveyor for conveying articles through a heated atmosphere. Under such conditions, if the conveyor includes a large number of painted articles, the temperature of the heated atmosphere would naturally drop, due to the absorption of the heat by the articles, and to the increased evaporation of the solvents of the paint.

Under these conditions, and with a decreased temperature, the conveyor should move slower because the paint would require a longer time to dry at a lower temperature, and therefore the conveyor should keep the painted articles on the conveyor a longer period of time.

The same would be true in the case of a baking oven, where my variable speed pulley may be used for automatically compensating the conveyor drive for any drops of temperature. The variable speed pulley may also be used in driving the fuel feed of a stoker, and it is of general application wherever the speed of drive may be advantageously varied responsive to temperature or pressure.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a variable diameter pulley, the combination of a pulley section adapted to be secured to a shaft or the like, with a second pulley section slidably mounted with respect to the first pulley section in an axial direction, said pulley sections being provided with opposed frusto conical surfaces adapted to form a pulley groove of wedge-shaped cross section, a frame carried by one of said sections in substantial dynamic balance therewith and having a part oppositely disposed to the other of said pulley sections, a plate having slidable engagement with said frame in a direction axially of said pulley sections and adapted to engage said other pulley section, and a pressure-responsive bellows interposed between said oppositely disposed frame part and said plate, whereby expansion of said bellows is adapted to move one of said pulley sections relatively to the other to vary the effective diameter of the pulley groove with respect to a wedge-shaped belt of constant width.

2. In a variable diameter pulley, the combination of a pulley section adapted to be secured to a shaft or the like, with a second pulley section slidably mounted with respect to the first pulley section in an axial direction, said pulley sections being provided with opposed frusto-conical surfaces adapted to form a pulley groove of wedge-shaped cross section, a frame carried by one of said sections in substantial dynamic balance therewith, and having a part oppositely disposed to the other of said pulley sections, guide means carried by said other pulley section adjacent said frame slidably to embrace said frame, a plate spanning said guide means and having a portion thereof disposed axially of said pulley, and a pressure responsive bellows interposed between said oppositely disposed frame part and said plate whereby expansion of said bellows is adapted to move said plate and one of said pulley sections relatively to the other to vary the effective diameter of said pulley with respect to a belt of constant width.

3. In a variable diameter pulley, the combination of a pulley section adapted to be secured to a shaft or the like, with a second pulley section slidably mounted with respect to the first pulley section in an axial direction, said pulley sections being provided with opposed frusto-conical surfaces adapted to form a pulley groove of wedge-shaped cross section, a straight-sided frame carried by one of said sections and having a part oppositely disposed to the other of said pulley sections, the other of said pulley sections having a straight-sided portion in slidable engagement with said frame to prevent relative rotative movement between said pulley sections, and a pressure responsive bellows interposed between said oppositely disposed frame part and said other pulley section whereby expansion of said bellows is adapted to move one of said pulley sections relatively to the other to vary the effective diameter of the pulley groove with respect to a wedge-shaped belt of constant width.

4. In a variable diameter pulley for use with a tensioned wedge-shaped belt of constant width, a pulley section adapted to be secured to a shaft or the like, a second pulley section slidably mounted with respect to the first pulley section in an axial direction, said pulley sections being provided with opposed frusto-conical surfaces adapted to form a pulley groove of wedge-shaped cross section, a straight-sided frame carried by one of said sections and having a part oppositely disposed to the other of said pulley sections, the other of said pulley sections having a straight-sided portion for slidably receiving said frame to prevent relative rotative movement between said pulley sections, an adjustable stop mounted to limit the slidable movement separating said pulley sections, and a pressure responsive bellows interposed between said oppositely disposed frame part and said other pulley section whereby expansion of said bellows is adapted to move one of said pulley sections relatively to the other against the action of said tensioned wedge belt to increase the effective diameter of the pulley groove with respect to said belt.

5. In a variable diameter pulley, the combination of a pulley section adapted to be secured to a shaft or the like, with a second pulley section slidably mounted with respect to the first pulley section in an axial direction, said pulley sections being provided with opposed frusto-conical surfaces adapted to form a pulley groove of wedge-shaped cross section, a frame carried by one of said sections in substantial dynamic balance therewith, the other pulley section than that carrying the frame having a part projecting beyond the pulley section carrying the frame, and a pressure-responsive bellows mounted concentrically with the pulley sections and interposed between the frame and the other pulley section, whereby expansion of the bellows is adapted to move the other pulley section relatively to the pulley section carrying the frame to vary the effective diameter of the pulley groove with respect to a wedge-shaped belt of constant width.

6. In a variable diameter pulley, the combination of a pulley section adapted to be secured to a shaft or the like, with a second pulley section slidably mounted with respect to the first pulley section in an axial direction, said pulley sections being provided with opposed frusto-conical surfaces adapted to form a pulley groove of wedge-shaped cross section, a frame carried by one of said sections in substantial dynamic balance therewith, the frame having an oppositely disposed part coaxial with the pulley sections, the other pulley section than that carrying the frame having a part in slidable engagement with the frame in a direction axially of the pulley sections and projecting axially beyond the pulley section carrying the frame, and a heat-responsive bellows positioned between the oppositely disposed frame part and the projecting pulley part, whereby expansion of the bellows is adapted to move the extending pulley section relatively to the frame and to the other pulley section to vary the effective diameter of the pulley groove with respect to a wedge-shaped belt of constant width.

7. In a variable diameter pulley, the combination of a pulley section adapted to be secured to a shaft or the like, with a second pulley section slidably mounted with respect to the first pulley section in an axial direction, said pulley sections being provided with opposed frusto-conical surfaces adapted to form a pulley groove of wedge-shaped cross section, a frame carried by one of said sections in substantial dynamic balance therewith and having a part oppositely disposed to the other pulley section, guide means carried by the other pulley section adjacent the frame to embrace said frame, the guide means being normally spaced from the frame to provide an operating clearance, and a pressure-responsive bellows interposed between the oppositely disposed frame part and the other pulley section, whereby expansion of the bellows is adapted to move the other pulley section relative to the section carrying the frame to vary the effective diameter of said pulley with respect to a belt of constant width.

8. In a variable diameter pulley, the combination of a pulley section comprising a substantially cylindrical hub, and a radially extending flange having a frusto-conical surface for engaging one side of a V-belt, said hub having a bore for receiving a shaft, with means for securing said hub to a shaft, a second pulley section comprising an annular metal member having a radially extending flange similar to the first mentioned flange, and having an oppositely extending frusto-conical surface for engaging the other side of a V-belt, said second pulley section being slidably mounted on said hub, and having a tubular extension surrounding said hub and adapted to project beyond said hub, said tubular extension having an axially extending groove, a U-shaped metal frame member having a pair of legs secured to said hub, and an expansible bellows carried by said U-shaped frame member, and adapted to act on said axial extension of said second section.

9. In a variable diameter pulley, the combination of a pulley section comprising a substantially cylindrical hub, and a radially extending flange having a frusto-conical surface for engaging one side of a V-belt, said hub having a bore for receiving a shaft, with means for securing said hub to a shaft, a second pulley section comprising an annular metal member having a radially extending flange similar to the first mentioned flange, and having an oppositely extending frusto-conical surface for engaging the other side of a V-belt, said second pulley section being slidably mounted on said hub, and having a tubular extension surrounding said hub and adapted to project beyond said hub, said tubular extension having an axially extending groove, a U-shaped metal frame member having a pair of legs secured to said hub, and an expansible bellows carried by said U-shaped frame member, and adapted to act on said axial extension of said second section, said bellows having a pressure plate mounted on one end adjacent said hub, and said pressure plate extending radially beyond said hub to engage said axial extension of said second section.

10. In a variable diameter pulley, the combination of a pulley section comprising a substantially cylindrical hub, and a radially extending flange having a frusto-conical surface for engaging one side of a V-belt, said hub having a bore for receiving a shaft, with means for securing said hub to a shaft, a second pulley section comprising an annular metal member having a radially extending flange similar to the first mentioned flange, and having an oppositely extending frusto-conical surface for engaging the other side of a V-belt, said second pulley section being slidably mounted on said hub, and having a tubular extension surrounding said hub and adapted to project beyond said hub, said tubular extension having an axially extending groove, a U-shaped metal frame member having a pair of legs secured to said hub, and an expansible bellows carried by said U-shaped frame member, and adapted to act on said axial extension of said second section, said U-shaped frame having one of its legs extending into said axially extending groove for preventing relative rotation between said second section and said hub.

11. In a variable diameter pulley, the combination of a pulley section comprising a substantially cylindrical hub, and a radially extending flange having a frusto-conical surface for engaging one side of a V-belt, said hub having a bore for receiving a shaft, with means for securing said hub to a shaft, a second pulley section comprising an annular metal member having a radially extending flange similar to the first mentioned flange, and having an oppositely extending frusto-conical surface for engaging the other side of a V-belt, said second pulley section being slidably mounted on said hub, and having a tubular extension surrounding said hub and adapted to project beyond said hub, said tubular extension having an axially extending groove, a U-shaped metal frame member having a pair of legs secured to said hub, and an expansible bellows carried by said U-shaped frame member, and adapted to act on said axial extension of said second section, said bellows being provided at one end with a supporting plate secured thereto, and having an axially extending threaded member, said frame having an aperture, and said bellows having its threaded member secured in said aperture.

12. In a variable diameter pulley, the combination of a pulley section comprising a substantially cylindrical hub, and a radially extending flange having a frusto-conical surface for engaging one side of a V-belt, said hub having a bore for receiving a shaft, with means for securing said hub to a shaft, a second pulley section comprising an annular metal member having a radially extending flange similar to the first mentioned flange, and having an oppositely extending frusto-conical surface for engaging the other side of a V-belt, said second pulley section being slidably mounted on said hub, and having a tubular extension surrounding said hub and adapted to project beyond said hub, said tubular extension having an axially extending groove, a U-shaped metal frame member having a pair of legs secured to said hub, and an expansible bellows carried by said U-shaped frame member, and adapted to act on said axial extension of said second section, said bellows being provided at one end with a supporting plate secured thereto, and having an axially extending threaded member, said frame having an aperture, and said bellows having its threaded member secured in said aperture, said threaded member and plate having a through bore for filling said bellows, and said through bore being closed at its outer end with solder.

13. In a variable diameter pulley, the combination of a pulley section comprising a substantially cylindrical hub, and a radially extending flange having a frusto-conical surface for engaging one side of a V-belt, said hub having a bore for receiving a shaft, with means for securing said hub to a shaft, a second pulley section comprising an annular metal member having a radially extending flange similar to the first mentioned flange, and having an oppositely extending frusto-conical surface for engaging the other side of a V-belt, said second pulley section being slidably mounted on said hub, and having a tubular extension surrounding said hub and adapted to project beyond said hub, said tubular extension having an axially extending groove, a U-shaped metal frame member having a pair of legs secured to said hub, and an expansible bellows carried by said U-shaped frame member, and adapted to act on said axial extension of said second section, said bellows having a pressure plate mounted on one end adjacent said hub, and said pressure plate extending radially beyond said hub to engage said axial extension of said second section, said bellows being fixedly secured at one end to said frame, and said pressure plate having grooves for slidably engaging said frame at its other end.

14. In a variable diameter pulley, the combination of a pulley section comprising a substantially cylindrical hub, and a radially extending flange having a frusto-conical surface for engaging one side of a V-belt, said hub having a bore for receiving a shaft, with means for securing said hub to a shaft, a second pulley section comprising an annular metal member having a radially extending flange similar to the first mentioned flange, and having an oppositely extending frusto-conical surface for engaging the other side of a V-belt, said second pulley section being slidably mounted on said hub, and having a tubular extension surrounding said hub and adapted to project beyond said hub, said tubular extension having an axially extending groove, a U-shaped metal frame member having a pair of legs secured to said hub, and an expansible bellows carried by said U-shaped frame member, and adapted to act on said axial extension of said second section, and adjustable stop means carried by said hub, and adapted to limit the spreading movement of said pulley sections.

WILLIAM W. HALLINAN.